United States Patent
Little (10) Patent No.: US 10,830,155 B2
(45) Date of Patent: Nov. 10, 2020

(54) VARIABLE VANE ARM RETENTION FEATURE

(71) Applicant: United Technologies Corporation, Farmington, CT (US)

(72) Inventor: Jonathan D. Little, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 98 days.

(21) Appl. No.: 15/891,552

(22) Filed: Feb. 8, 2018

(65) Prior Publication Data

US 2020/0158025 A1    May 21, 2020

(51) Int. Cl.
*F02C 9/22* (2006.01)
*F01D 9/04* (2006.01)

(52) U.S. Cl.
CPC .............. *F02C 9/22* (2013.01); *F01D 9/04* (2013.01); *F05D 2220/32* (2013.01); *F05D 2240/12* (2013.01)

(58) Field of Classification Search
CPC .... F04D 27/002; F04D 27/0246; F04D 29/00; F04D 29/24; F04D 29/30; F01D 17/162; F01D 17/14; F01D 17/148; F01D 17/16; F05D 2260/36; F05D 2260/50; F05D 2240/12
See application file for complete search history.

(56) References Cited

U.S. PATENT DOCUMENTS

| 6,019,574 A | 2/2000 | DiBella |
| 7,011,494 B2 | 3/2006 | Kies et al. |

(Continued)

FOREIGN PATENT DOCUMENTS

| FR | 2904669 A1 | 2/2008 |
| WO | 2009076508 A1 | 6/2009 |
| WO | 2014158455 A1 | 10/2014 |

OTHER PUBLICATIONS

Extended European Search Report for Application No. 19156292.5-1006; dated Aug. 2, 2019; Report Received Date: Aug. 9, 2019; 8 pages.

(Continued)

*Primary Examiner* — David E Sosnowski
*Assistant Examiner* — Danielle M. Christensen
(74) *Attorney, Agent, or Firm* — Cantor Colburn LLP (57) ABSTRACT

A variable vane actuation system of a gas turbine engine is provided. The variable vane actuation system comprising: a vane arm having a radially inward facing surface, a radially outward surface opposite the radially inward facing surface, a wedge projecting away from the radially inward facing surface, an aperture extending from the radially outward surface to the radially inward surface, and an interlocking feature located in the aperture and circumferentially opposite the wedge relative to the aperture; and a vane stem having a first end, a second end opposite the first end, a seat surface interposed between the first end and the second end, a primary portion extending from the first end to the seat surface, a secondary portion extending from the seat surface to the second end, and a stem notch configured to interlock with the interlocking feature of the vane arm.

20 Claims, 9 Drawing Sheets

(56) References Cited

U.S. PATENT DOCUMENTS

| | | |
|---|---|---|
| 8,414,248 B2 | 4/2013 | Perez et al. |
| 9,988,926 B2* | 6/2018 | Gasmen ................ F01D 17/162 |
| 2016/0032759 A1* | 2/2016 | Gasmen ................ F01D 17/162 |
| | | 415/148 |

OTHER PUBLICATIONS

European Office Action dated May 26, 2020; EP Application No. 19156292.5; 4 pages.

* cited by examiner

VARIABLE VANE ARM RETENTION FEATURE

BACKGROUND

The subject matter disclosed herein generally relates to variable vane arms for variable vane actuation systems of gas turbine engines and, more particularly, to a method and apparatus for retaining variable vane arms for variable vane actuation systems of gas turbine engines.

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Vanes are provided between rotating blades in the compressor and turbine sections. Moreover, vanes are also provided in the fan section. In some instances the vanes are movable to tailor flows to engine operating conditions. Variable vanes are mounted about a pivot and are attached to an arm that is in turn actuated to adjust each of the vanes of a stage. A specific orientation between the arm and vane is required to assure that each vane in a stage is adjusted as desired to provide the desired engine operation. Accordingly, the connection of the vane arm to the actuator and to the vane is provided with features that assure a proper connection and orientation.

SUMMARY

According to one embodiment, a variable vane actuation system of a gas turbine engine is provided. The variable vane actuation system comprising: a vane arm having a radially inward facing surface, a radially outward surface opposite the radially inward facing surface, a wedge projecting away from the radially inward facing surface, an aperture extending from the radially outward surface to the radially inward surface, and an interlocking feature located in the aperture and circumferentially opposite the wedge relative to the aperture; and a vane stem having a first end, a second end opposite the first end, a seat surface interposed between the first end and the second end, a primary portion extending from the first end to the seat surface, a secondary portion extending from the seat surface to the second end, and a stem notch configured to interlock with the interlocking feature of the vane arm.

In addition to one or more of the features described above, or as an alternative, further embodiments may include: a locking nut having internal threads configured to mesh with external threads located on the primary portion of the vane stem; or a bolt having external threads configured to mesh with internal threads located on the primary portion of the vane stem.

In addition to one or more of the features described above, or as an alternative, further embodiments may include that the vane stem further comprises: a radially upper shoulder located in the secondary portion proximate the seat surface; and a radially lower shoulder located in the secondary portion and interposed between the radially upper shoulder and the second end, wherein the stem notch extends from the upper shoulder to the radially upper shoulder to the radially lower shoulder.

In addition to one or more of the features described above, or as an alternative, further embodiments may include that the interlocking feature of the vane arm includes a notch in the aperture extending into the vane arm.

In addition to one or more of the features described above, or as an alternative, further embodiments may include that the notch in the aperture is located proximate the radially outward surface of the vane arm.

In addition to one or more of the features described above, or as an alternative, further embodiments may include that the interlocking feature of the vane arm includes a pin.

In addition to one or more of the features described above, or as an alternative, further embodiments may include that the pin is oriented perpendicular to the stem notch.

In addition to one or more of the features described above, or as an alternative, further embodiments may include that the pin is oriented parallel to the stem notch.

In addition to one or more of the features described above, or as an alternative, further embodiments may include that the pin extends through the aperture.

In addition to one or more of the features described above, or as an alternative, further embodiments may include that the pin extends partially into the aperture.

In addition to one or more of the features described above, or as an alternative, further embodiments may include that the stem notch is configured to interlock with the interlocking feature of the vane arm when the secondary portion is within the aperture, the radially outward surface of the vane arm is flush with the seat surface of the vane stem, and the locking nut is installed on the primary portion of the vane stem.

According to another embodiment, a gas turbine is provided. A gas turbine engine comprising: a vane system; and a variable vane actuation system operably connected to the vane system, the variable vane actuation system comprising: a vane arm having a radially inward facing surface, a radially outward surface opposite the radially inward facing surface, a wedge projecting away from the radially inward facing surface, an aperture extending from the radially outward surface to the radially inward surface, and an interlocking feature located in the aperture and circumferentially opposite the wedge relative to the aperture; and a vane stem having a first end, a second end opposite the first end, a seat surface interposed between the first end and the second end, a primary portion extending from the first end to the seat surface, a secondary portion extending from the seat surface to the second end, and a stem notch configured to interlock with the interlocking feature of the vane arm.

In addition to one or more of the features described above, or as an alternative, further embodiments may include: a locking nut having internal threads configured to mesh with external threads located on the primary portion of the vane stem; or a bolt having external threads configured to mesh with internal threads located on the primary portion of the vane stem.

In addition to one or more of the features described above, or as an alternative, further embodiments may include that the vane stem further comprises: a radially upper shoulder located in the secondary portion proximate the seat surface; and a radially lower shoulder located in the secondary portion and interposed between the radially upper shoulder and the second end, wherein the stem notch extends from the upper shoulder to the radially upper shoulder to the radially lower shoulder.

In addition to one or more of the features described above, or as an alternative, further embodiments may include that the interlocking feature of the vane arm includes a notch in the aperture extending into the vane arm.

In addition to one or more of the features described above, or as an alternative, further embodiments may include that the notch in the aperture is located proximate the radially outward surface of the vane arm.

In addition to one or more of the features described above, or as an alternative, further embodiments may include that the interlocking feature of the vane arm includes a pin.

In addition to one or more of the features described above, or as an alternative, further embodiments may include that the pin is oriented perpendicular to the stem notch.

In addition to one or more of the features described above, or as an alternative, further embodiments may include that the pin is oriented parallel to the stem notch.

In addition to one or more of the features described above, or as an alternative, further embodiments may include that the pin extends through the aperture.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
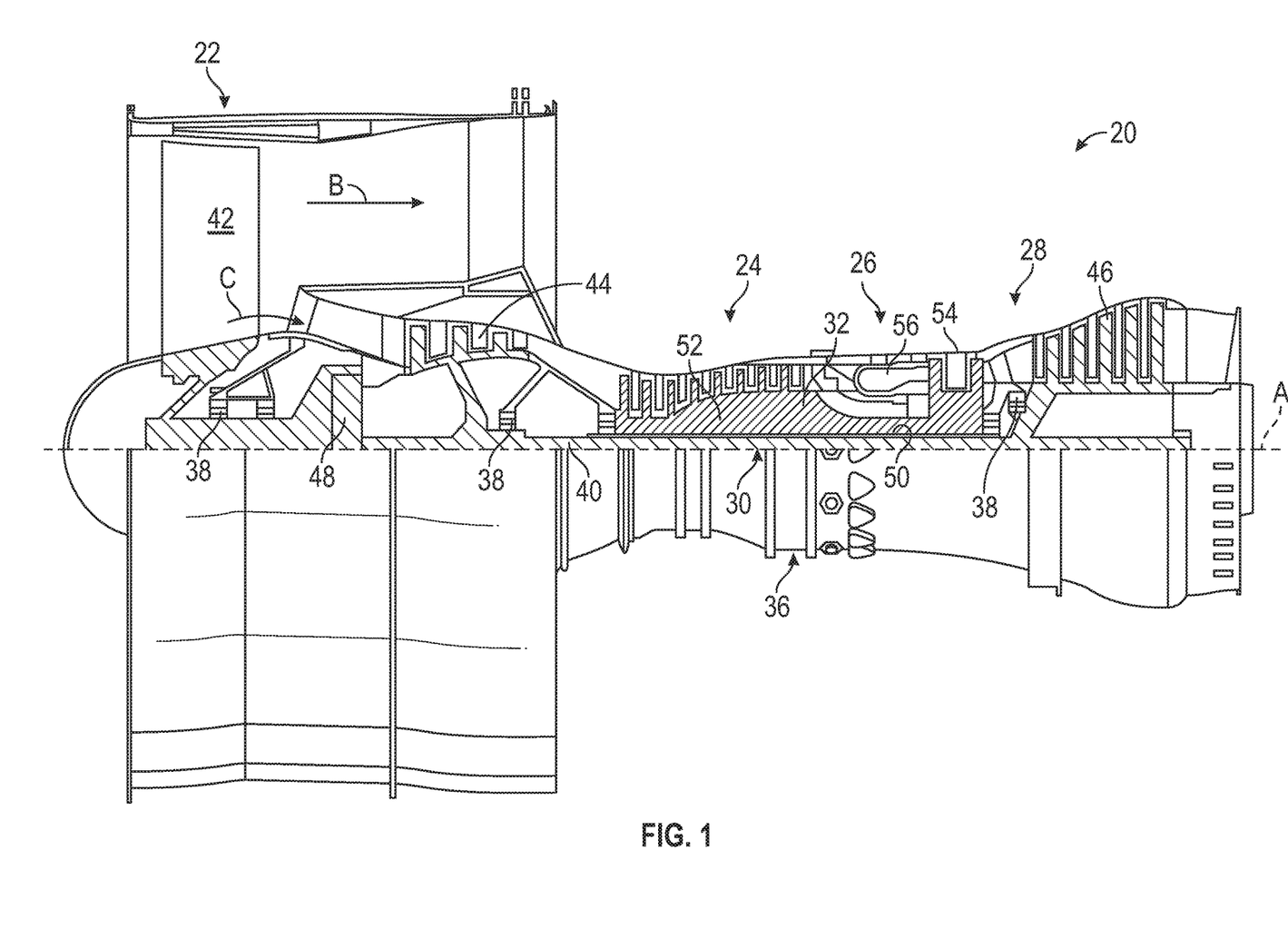
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
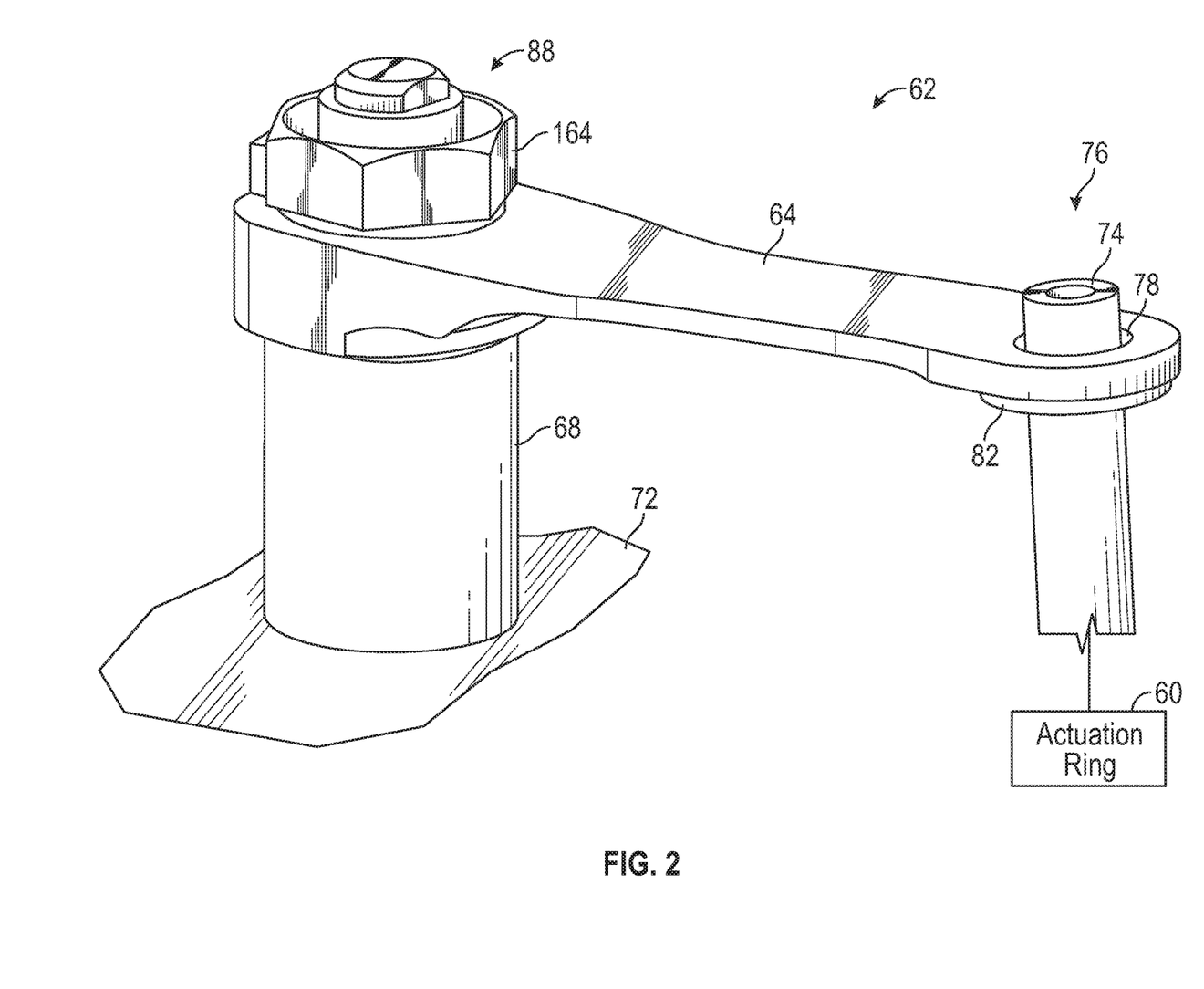
FIG. 2 illustrates a perspective view of a variable vane actuation system used within the engine of FIG. 1, in accordance with an embodiment of the disclosure.
Figure 3:
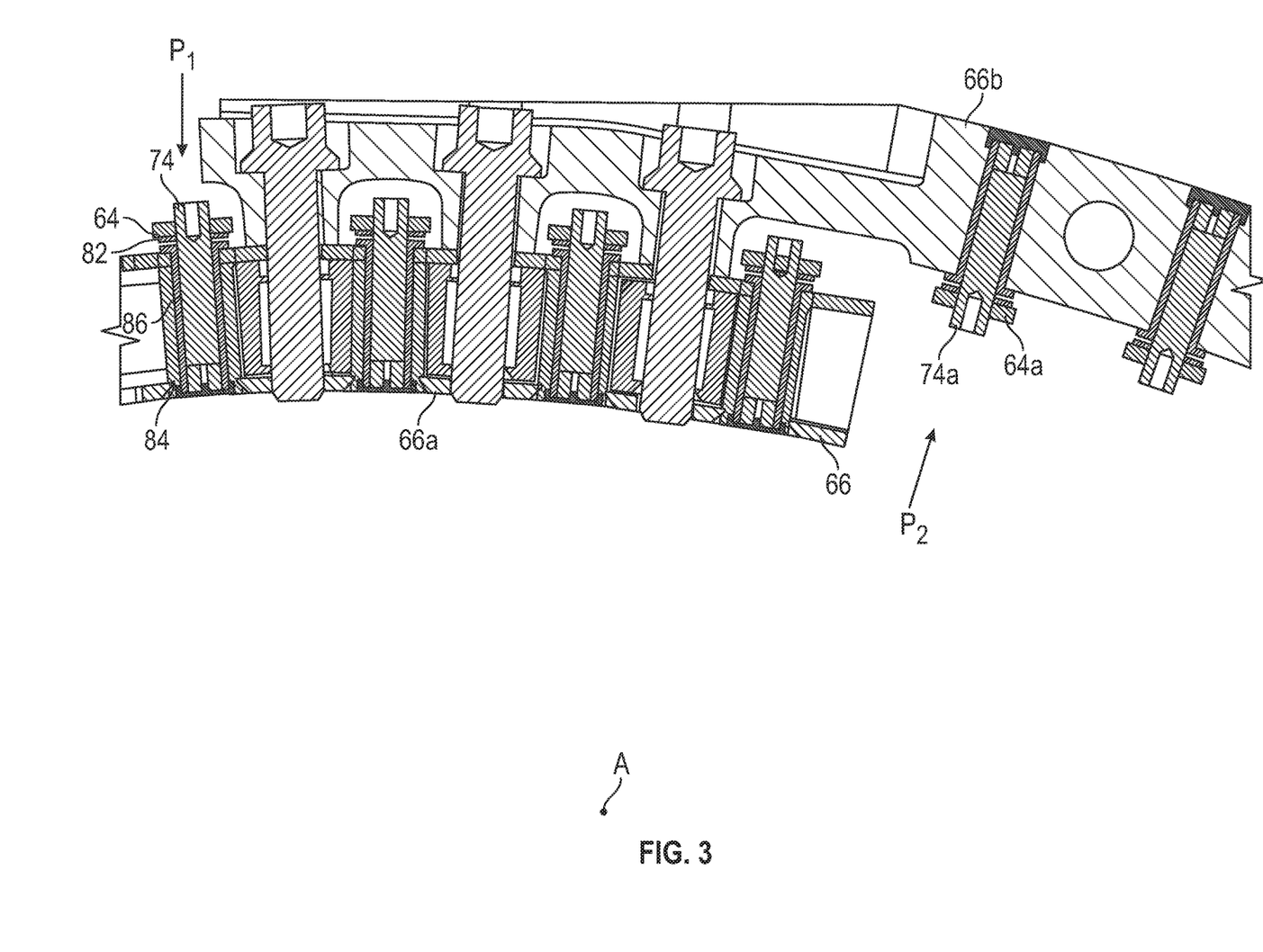
FIG. 3 illustrates an actuation ring used in connection with the system of FIG. 2, in accordance with an embodiment of the disclosure.

Referring to FIGS. 2-3, an example variable vane actuation system 62 includes a vane arm 64 coupling an actuation ring 66 to a vane stem 68. Rotating the actuation ring 66 circumferentially about the axis A (FIG. 1) moves the vane arm 64 to pivot the vane stem 68, and an associated variable vane 72. The example vane arm 64 is used to manipulate variable guide vanes in the high pressure compressor section 52 of the engine 20 of FIG. 1.

A pin 74 is attached to an end 76 of the vane arm 64. The example pin 74 and vane arm 64 rotate together. In this example, the pin 74 is received within an aperture 78 and then swaged to hold the pin 74 relative to the vane arm 64. A collar 82 of the pin 74 may contact the vane arm 64 during assembly to ensure that the pin 74 is inserted to an appropriate depth prior to swaging.

The pin 74 is radially received within a sync ring bushing 86, which is received within a, typically metal, sleeve 84. The actuation (or sync) ring 66 holds the metal sleeve 84. The bushing 86 permits the pin 74 and the vane arm 64 to rotate together relative to the actuation ring 66 and the metal sleeve 84. The pin 74 and the vane arm 64 are inserted into the bushing 86 by traveling along a radial path P1.

As illustrated in FIG. 3, the pin 74 may be oriented relative to the vane arm 64 such that the pin 74 extends radially toward the axis A. In the orientation illustrated in FIG. 3, the pin 74 is moved along the path P1 radially toward the axis A to secure the pin 74 to the sync ring 66a. In an alternate pin 74a orientation opposite, the pin 74a may extend radially away from the axis A. In this alternate pin 74 orientation, the pin 74a is moved along the path P2 radially outward away from the axis A to fit within a splice plate portion 66b of the actuation ring 66. Vane arms 64 and 64a have the same geometry and may be used for accommodating both types of installations.

Referring now to FIGS. 4, 5a-5e, and 6a-6b with continuing reference to FIGS. 2-3, an end 88 of the vane arm 64 includes features for a secondary retention method of securing the vane arm 64 to the vane stem 68. The disclosed vane arm 64 includes a radially inward facing surface 96 and a radially outward facing surface 110 opposite the radially inward facing surface 96. Side surfaces 112 of the end 88 extend radially to connect edges of the radially outward facing surface 110 to edges of the radially inward facing surface 96.

Figure 4:
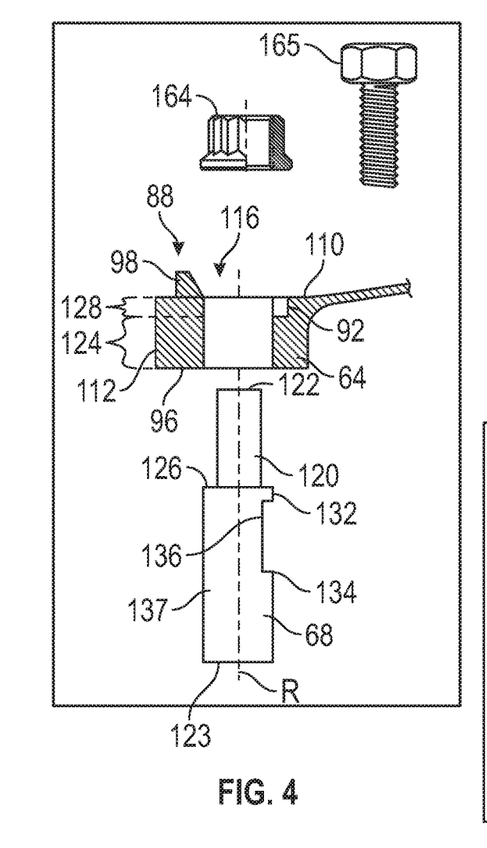
FIG. 4 illustrates an exploded cross-sectional view of a variable vane actuation system used within the engine of FIG. 1, in accordance with an embodiment of the disclosure.

The end 88 of the vane arm 64 includes an aperture 116 extending from the radially inward surface 96 to the radially outward surface 110. The aperture 116 receives a primary portion 120 of the vane stem 68. The aperture 116 includes a first axial section 124 and a second axial section 128. The first axial section 124 may be located proximate the radially inward facing surface 96 and the second axial section 128 may be located proximate the radially outward facing surface 110. The first axial section 124 has a generally D-shaped cross-sectional profile (see FIG. 6a and FIG. 6b). The second axial section 128 has a generally D-shaped cross-sectional profile that includes a notch 92 (see FIG. 6a and FIG. 6b). The notch 92 may be located circumferentially opposite a wedge 98 relative to the aperture 116. The notch 92 extending into the vane arm 64. The wedge 98 is projecting away from the radially outward surface 110.

Figure 11:
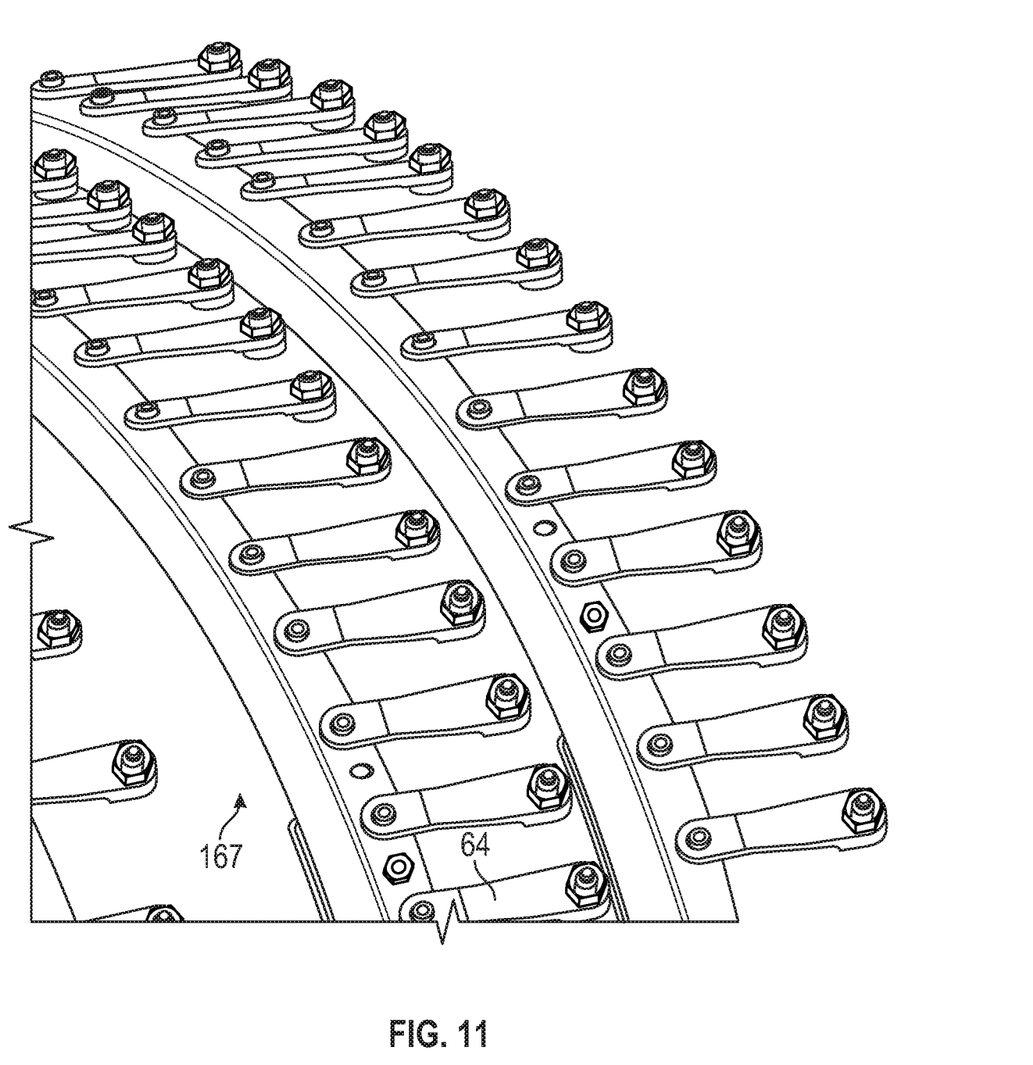
FIG. 11 illustrates a stage of vane arms, in accordance with an embodiment of the disclosure.

The vane stem 68 including a first end 122, a second end 123 opposite the first end 122, a surface 126 interposed between the first end 122 and the second end 123, a primary portion 120, and a secondary portion 137. The primary portion 120 extending from a first end 122 to the surface 126, as seen in FIG. 4. The primary portion 120 may have external threads configured to mesh with internal threads of the locking nut 164. It is understood that embodiments disclose herein may include other primary locking mechanism other than the locking nut 164 and thus the primary portion 120 may not have external threads for example the locking nut 164 may be replaced by a bolt 165 engaging with internal threads in the vane stem 68. The bolt 165 may have external threads configured to mesh with internal threads located on the primary portion 120 of the vane stem 68. The engagement of the vane arm 64 to the vane stem 68 and its capability to transmit torque from the vane arm 64 to the vane stem 68 is provided by a wedge feature 198 located on the secondary portion 137 of the vane stem 68 and first axial section 124 below the notch 128 of the vane arm 64 (see FIG. 5d). The secondary portion 137 extending from the surface 126 to the second end 123. The vane stem 68 includes a stem notch 136 having a radially upper shoulder 132 and a radially lower shoulder 134. The stem notch 136 is located in a secondary portion 137 of the vane stem 68. The stem notch 136 extending axially along the axis R from the radially upper shoulder 132 to the radially lower shoulder 134 and facing outward from the axis R. The radially upper shoulder 132 may be located proximate a surface 126 of the primary portion 120 of the vane stem 68. The surface 126 may align above the radially outward facing surface 110 when the locking nut 164 is installed (see FIG. 5c) so that the threads do not bottom out before the wedge feature 198 is fully engaged (see FIG. 5d). The surface 126 serves as a seat or a stop for the locking nut 164 when the locking nut 164 is installed (see FIG. 5c). The upper shoulder 132 of the vane stem 68 is configured to interlock with the notch 92 of the vane arm 64, thus the notch 92 may be considered an interlocking feature of the vane arm 64. Advantageous, the interlocking connection of the upper shoulder 132 of the vane stem 68 and the notch 92 of the vane arm 64 prevents radial motion along axis R between the vane stem 68 and the vane arm 64 if the locking nut 164, which is the primary retention method, were to loosen because the vane arm 64 is constrained from disengaging from the upper shoulder 132 by the other vane arm 64 attachments in the stage 167, as shown by FIG. 11.

The first axial section 124 and the second axial section 128 are machined into the end 88. The machining operations permit controlled material removal such that the first axial section 124 extends partially through a radial thickness of the vane arm 64 and the second axial section 128 extends radially partially through the end 88. Notably, EDM, broaching or non-conventional machining may be required to create the aperture 116 having a "D" shaped feature and slot. The vane arm 64 may be formed out of nickel, steel or titanium material.

Figure 5A:
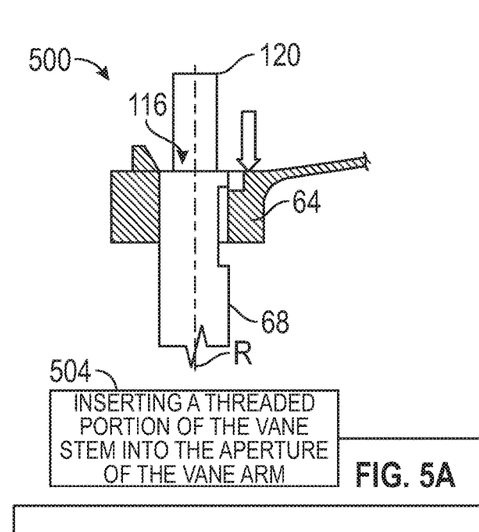
FIG. 5a-e illustrates cross-sectional view of a method of assembling the variable vane actuation system of FIG. 4, in accordance with an embodiment of the disclosure.
Figure 5B:
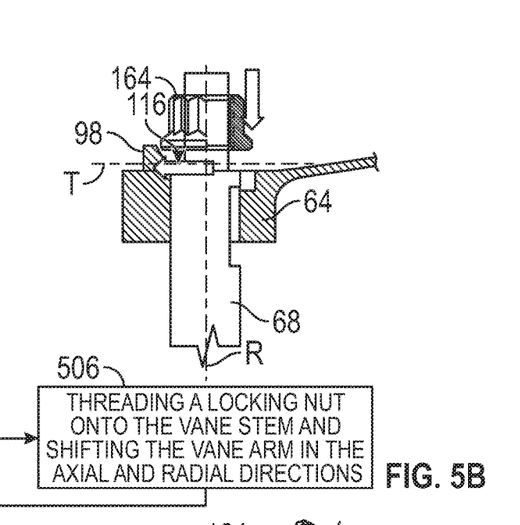
Figures 5C, 5D:
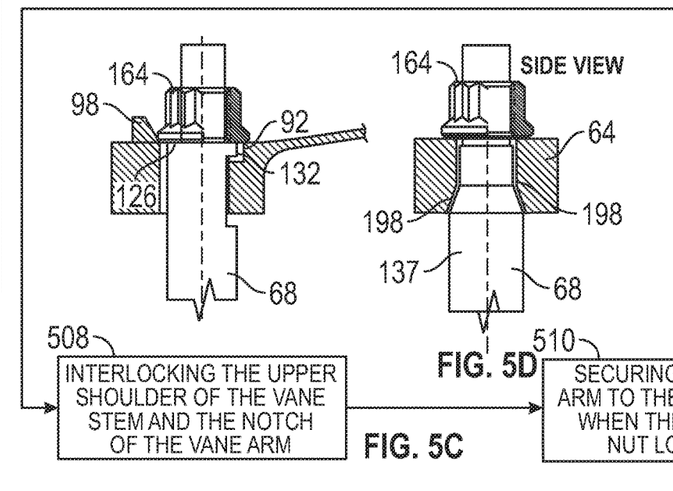
Figure 5E:
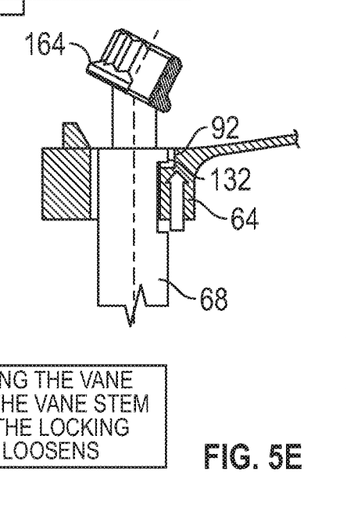
Figure 6A:
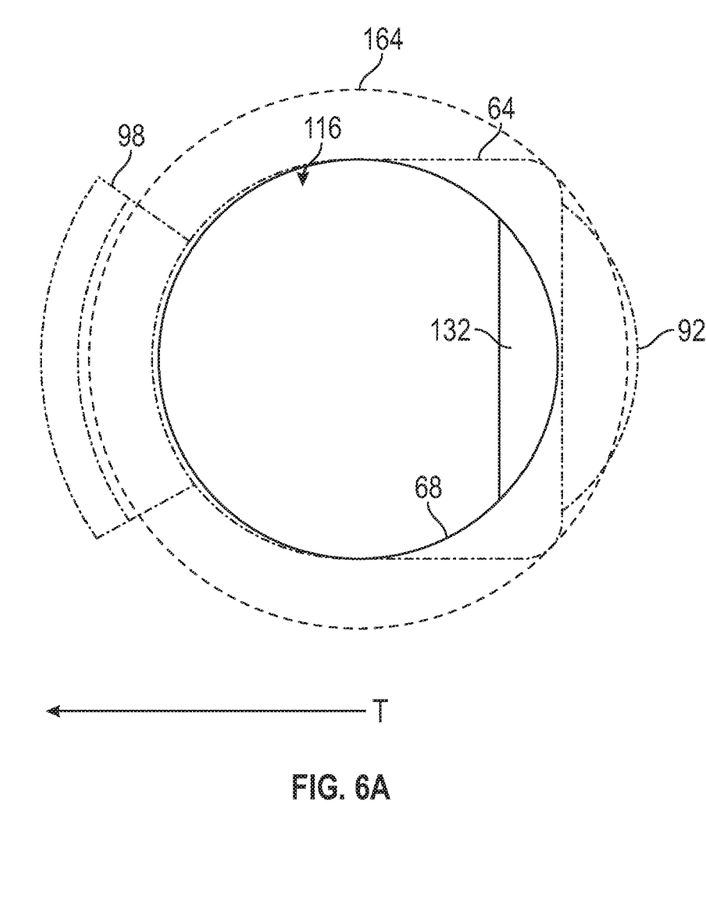
FIG. 6a illustrates cross-sectional top view of the variable vane actuation system of FIG. 4 in an unlocked position, in accordance with an embodiment of the disclosure.
Figure 6B:
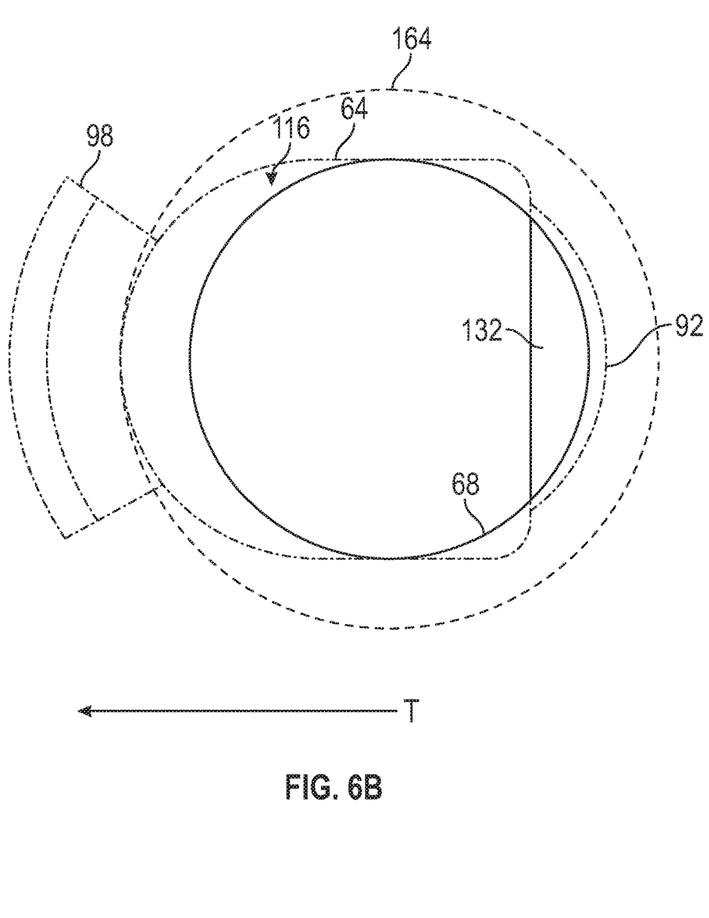
FIG. 6b illustrates cross-sectional top view of the variable vane actuation system of FIG. 4 in an interlocked position, in accordance with an embodiment of the disclosure.

Referring now to method 500 illustrated in FIGS. 5a-5e with continued reference to FIGS. 1-4, 6a, and 6b. Method 500 illustrates a method of assembling the vane arm 64, vane stem 68, and the locking nut 164. At block 504, the primary portion 120 of the vane stem 68 is inserted into the aperture 116 of the vane arm 64. The vane arm 64 is then slid radially along axis R until the aperture 116 is past the primary portion 120, as seen in FIG. 5a. FIGS. 6a and 6b illustrates a cross-sectional view the vane arm 64, wedge 98, aperture 116, locking nut 164, vane stem 68, notch 92, and the upper shoulder 132. FIG. 6a is a top cross-sectional view prior to the interlocking of the upper shoulder 132 of the vane stem 68 and the notch 92 of the vane arm 64.

After the vane stem 68 is received through the aperture 116, a locking nut 164 is then threaded onto the primary portion 120 of the vane stem 68 to hold the vane stem 68 and the vane arm 64 together, at block 506. The locking nut 164 serves as the primary retention method for the vane arm 64. As the locking nut 164 is threaded onto the primary portion 120 of the vane stem 68, the locking nut 164 pushes the wedge 98 in an axial direction T perpendicular to the R axis. The radial motion along the R axis of the locking nut 164 moves the wedge 98, thus the vane arm 64 in the axial direction T, as seen in FIG. 5b. The axial motion of the vane arm 64 allows the upper shoulder 132 of the vane stem 68 to slide into and to interlock with the notch 92 of the vane arm 64 at block 508, as seen in FIG. 5c in which the locking nut 164 is fully seated. Also, the axial and radially motion of the vane arm 64 allows the first axial section 124 to slide into and interlock with the stem notch 136, as also seen in FIG. 5c. FIG. 5d shows an end view of the wedge feature 198. The engagement of the vane arm 64 to the vane stem 68 and its capability to transmit torque from the vane arm 64 to the vane stem 68 is provided by a wedge feature 198 located on the secondary portion 137 of the vane stem 68 and first axial section 124 below the notch 128 of the vane arm 64. FIG. 6b shows a top cross-sectional view the interlocking of the upper shoulder 132 of the vane stem 68 and the notch 92 of the vane arm 64. At block 510, in the event the locking nut 164 comes loose, the vane arm 64 is secured to the vane stem 68 through interlocking of the upper shoulder 132 of the vane stem 68 and the notch 92 of the vane arm 64, as seen in FIG. 5e note that the vane arm 64 cannot move axially and disengage from the stem notch 136 as it is retained in that position by the other vane arms 64 in the stage. It can also be seen in FIG. 6b that the clamping surface of the locking nut 164 on the vane arm 64 is large enough to provide a uniform attaching load.

Referring now to FIGS. 7, 8a-8e, 9a-9b, and 10a-10b with continuing reference to FIGS. 2-3, an end 88 of the vane arm 64 includes features for a secondary retention method of securing the vane arm 64 to the vane stem 68. The disclosed vane arm 64 includes a radially inward facing surface 96 and a radially outward facing surface 110 opposite the radially inward facing surface 96. Side surfaces 112 of the end 88 extend radially to connect edges of the radially outward facing surface 110 to edges of the radially inward facing surface 96.

The end 88 of the vane arm 64 includes an aperture 116 extending from the radially inward surface 96 to the radially outward surface 110. The aperture 116 receives a primary portion 120 of the vane stem 68. The aperture 116 has a round cross-sectional profile (see FIGS. 9a-9b and 10a-10b). Advantageous to the D shaped hole described in FIG. 4, the aperture 116, being a round hole is much easier to produce by drilling. The aperture 116 includes a pin 192 that projects partially into (see FIGS. 10a-10b) the aperture 116 and/or through (see FIGS. 9a-9b) the aperture 116. The pin 192 may be located circumferentially opposite a wedge 98 relative to the aperture 116. The notch 92 extending into the vane arm 64. The wedge 98 is projecting away from the radially outward surface 110.

Figure 7:
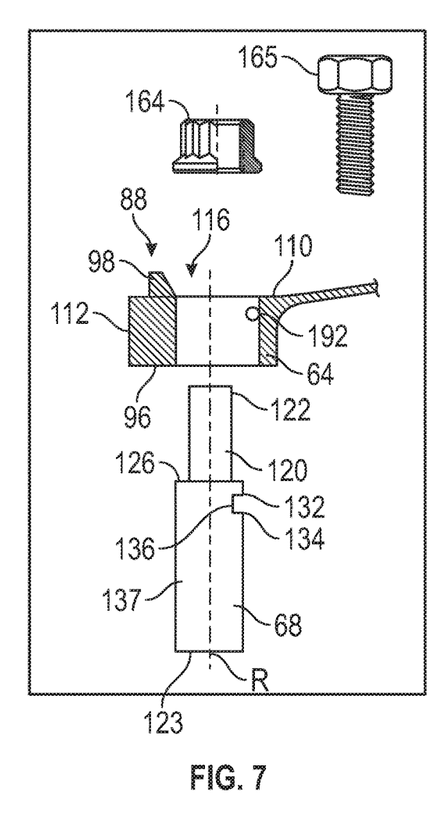
FIG. 7 illustrates an exploded cross-sectional view of a variable vane actuation system used within the engine of FIG. 1, in accordance with an embodiment of the disclosure.

The vane stem 68 including a first end 122, a second end 123 opposite the first end 122, a surface 126 interposed between the first end 122 and the second end 123, a primary portion 120, and a secondary portion 137. The primary portion 120 extending from a first end 122 to the surface 126, as seen in FIG. 7. The primary portion 120 may have external threads configured to mesh with internal threads of the locking nut 164. It is understood that embodiments disclose herein may include other primary locking mechanism other than the locking nut 164 and thus the primary portion 120 may not have external threads for example the locking nut 164 may be replaced by a bolt 165 engaging with internal threads in the vane stem 68. The bolt 165 may have external threads configured to mesh with internal threads located on the primary portion 120 of the vane stem 68. The engagement of the vane arm 64 to the vane stem 68 and its capability to transmit torque from the vane arm 64 to the vane stem 68 is provided by a wedge feature 198 located on secondary portion 137 of the vane stem 68 and with the aperture 116 of the vane arm 64 (see FIG. 8d). The secondary portion 137 extending from the surface 126 to the second end 123. The vane stem 68 includes a stem notch 136 having a radially upper shoulder 132 and a radially lower shoulder 134. The stem notch 136 is located in a secondary portion 137 of the vane stem 68. The stem notch 136 extending axially along the axis R from the radially upper shoulder 132 to the radially lower shoulder 134 and facing outward from the axis R. The radially upper shoulder 132 may be located proximate a surface 126 of the vane stem 68. The surface 126 may align above the radially outward facing surface 110 when the locking nut 164 is installed (see FIG. 8c) so that the threads do not bottom out before the wedge feature 198 is fully engaged (see FIG. 8d). The upper shoulder 132 of the vane stem 68 is configured to interlock with the pin 92. Advantageous, the interlocking connection of the upper shoulder 132 of the vane stem 68 and the pin 192 prevents radial motion along axis R between the vane stem 68 and the vane arm 64 if the locking nut 164, which is the primary retention method, were to loosen because the vane arm 64 is constrained from disengaging from the upper shoulder 132 by the other vane arm 64 attachments in the stage 167, as shown by FIG. 11.

The pin 192 may be pressed into the vane arm 64 and staked at one end. The pin 192 may project through the aperture, as seen in FIGS. 7, 8a-d, and 9a-b. Alternatively, the pin 192 may project partially through the aperture, as seen in FIGS. 10a-10b. The pin 192 may be oriented parallel with the stem notch 136, as seen in FIGS. 7, 8a-d, and 9a-b. The pin 192 may be oriented parallel with the stem notch 136, as seen in FIGS. 10a-10b.

Figure 8A:
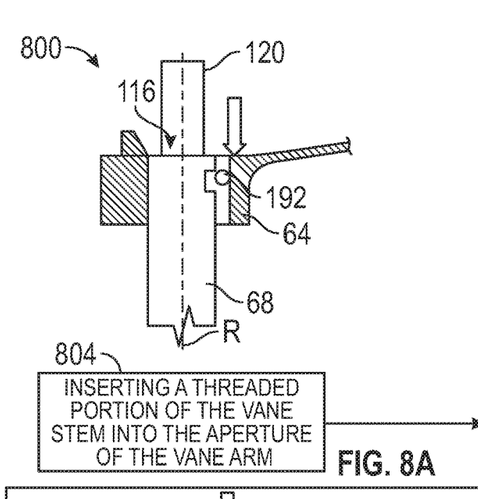
FIG. 8a-e illustrates cross-sectional view of a method of assembling the variable vane actuation system of FIG. 7, in accordance with an embodiment of the disclosure.
Figure 8B:
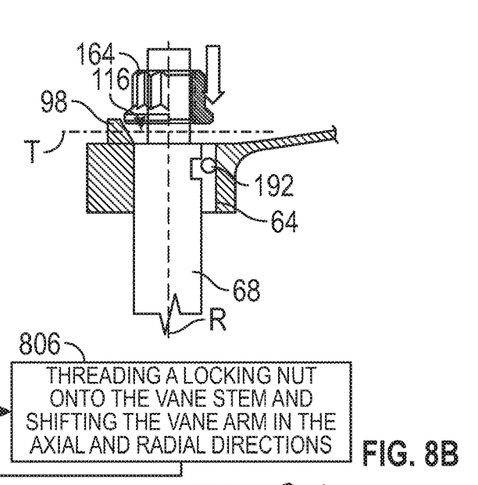
Figures 8C, 8D, 8E:
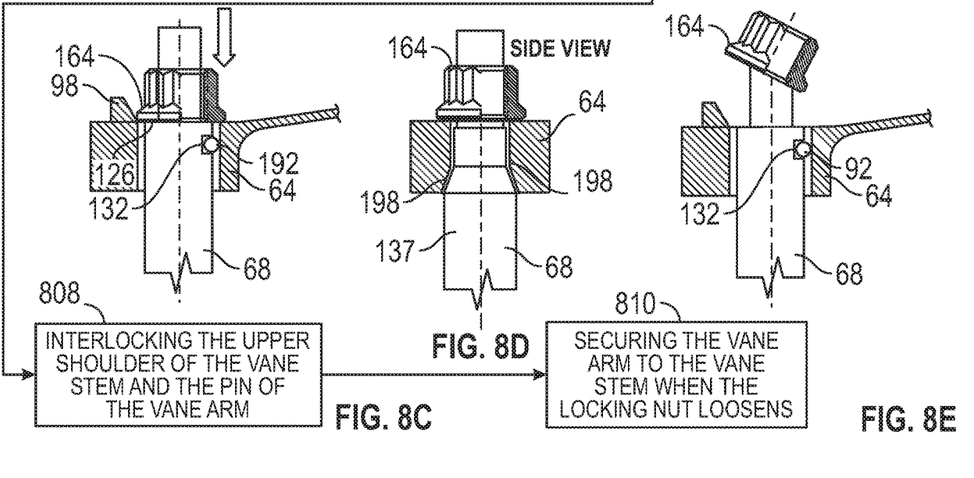
Figure 9A:
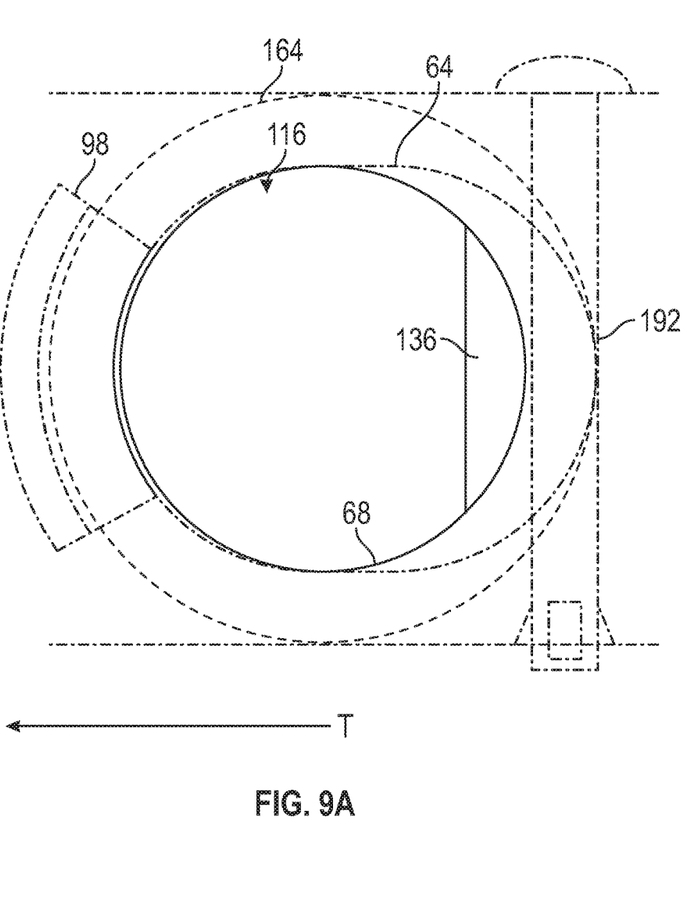
FIG. 9a illustrates cross-sectional top view of the variable vane actuation system of FIG. 7 in an unlocked position, in accordance with an embodiment of the disclosure.
Figure 9B:
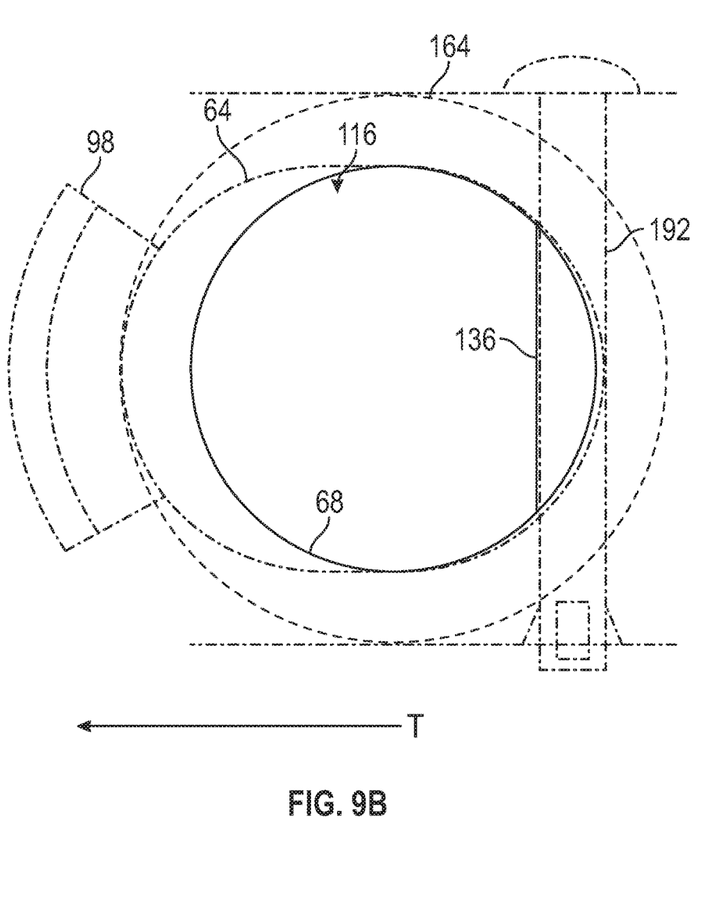
FIG. 9b illustrates cross-sectional top view of the variable vane actuation system of FIG. 7 in an interlocked position, in accordance with an embodiment of the disclosure.
Figure 10A:
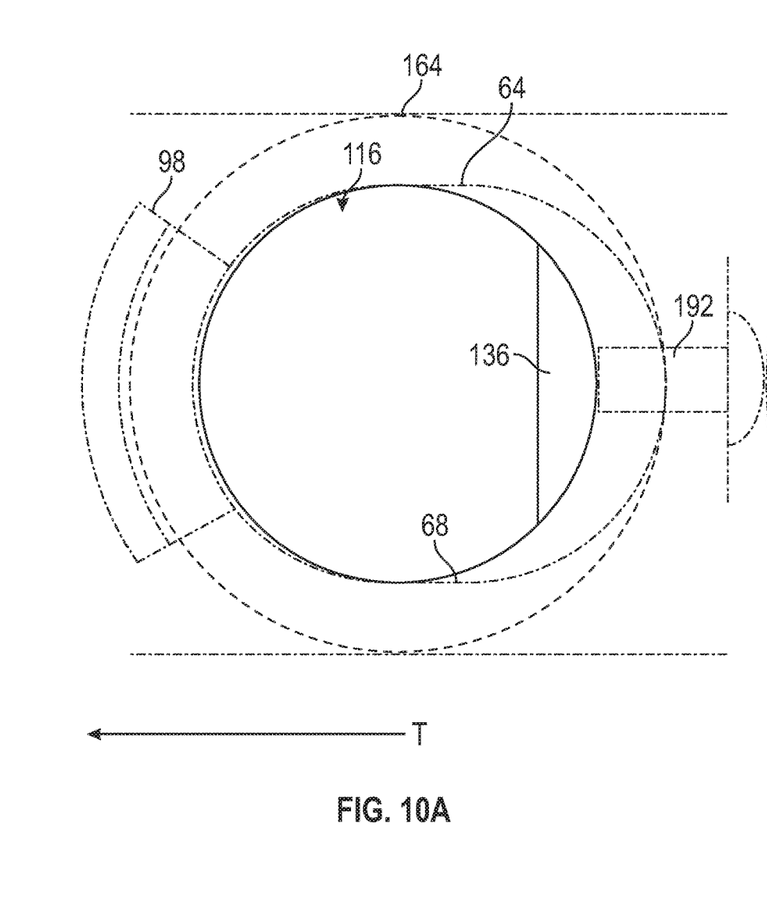
FIG. 10a illustrates cross-sectional top view of the variable vane actuation system of FIG. 7 in an unlocked position and having an alternate pin, in accordance with an embodiment of the disclosure.
Figure 10B:
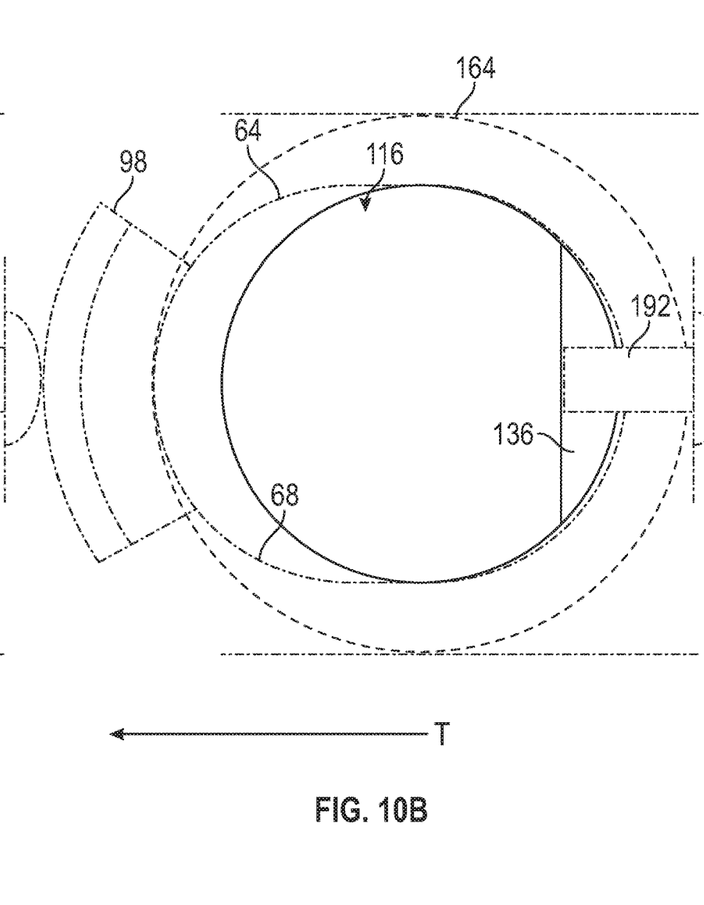
FIG. 10b illustrates cross-sectional top view of the variable vane actuation system of FIG. 7 in an interlocked position and having an alternate pin, in accordance with an embodiment of the disclosure.

Referring now to method 800 illustrated in FIGS. 8a-8e with continued reference to FIGS. 1-3, 7, 9a-9b, and 10a-10b. Method 800 illustrates a method of assembling the vane arm 64, vane stem 68, and the locking nut 164. At block 804, the primary portion 120 of the vane stem 68 is inserted into the aperture 116 of the vane arm 64. The vane arm 64 is then slid radially along axis R until the aperture 116 is past the primary portion 120. FIGS. 9a-9b and 10a-10b illustrates a cross-sectional view the vane arm 64, wedge 98, aperture 116, locking nut 164, vane stem 68, pin 192, and the stem notch 136. FIGS. 10a-b illustrate a different configuration for the pin 192, as mentioned above. In FIGS. 10a-10b the pin 192 projects partially into the aperture 116, as opposed to FIGS. 9a-9b where the pin 192 projects through the aperture 116. FIGS. 9a and 10a show a top cross-sectional view prior to the interlocking of the stem notch 136 of the vane stem 68 and the pin 192 of the vane arm 64. Prior to block 804, the pin 192 may have been pressed into the vane arm 64 and staked at one end. As mentioned above, the pin 192 may be pressed into the vane arm 64 such that it projects into and/or through the aperture 116.

After the vane stem 68 is received through the aperture 116, a locking nut 164 is then threaded onto the primary portion 120 of the vane stem 68 to hold the vane stem 68 and the vane arm 64 together, at block 806. The locking nut 164 serves as the primary retention method for the vane arm 64. As the locking nut 164 is threaded onto the primary portion 120 of the vane stem 68, the locking nut 164 pushes the wedge 98 in an axial direction T perpendicular to the R axis. The radial motion along the R axis of the locking nut 164 moves the wedge 98, thus the vane arm 64 in the axial direction T, as seen in FIG. 8b. The axial and radially motion of the vane arm 64 allows pin 192 to slide past the upper shoulder 132 of the vane stem 68 into the stem notch 136, thus the pin 192 is now interlocked with the stem notch 136 at block 808, as seen in FIG. 8c. FIG. 8d shows an end view of the wedge feature 198. The engagement of the vane arm 64 to the vane stem 68 and its capability to transmit torque from the vane arm 64 to the vane stem 68 is provided by a wedge feature 198 located on the secondary portion 137 of the vane stem 68 and within the aperture 116 of the vane arm 64. FIGS. 9b and 10b show a top cross-sectional view the interlocking of the stem notch 136 of the vane stem 68 and the pin 192 of the vane arm 64. At block 810, in the event the locking nut 164 comes loose, the vane arm 64 is secured to the vane stem 68 through interlocking of the stem notch 136 of the vane stem 68 and the notch 92 of the vane arm 64, as seen in FIG. 8e because the vane arm 64 is constrained from disengaging from the upper shoulder 132 by the other vane arm 64 attachments in the stage 167, as shown by FIG. 11.

Advantageously, if the vane arm 64 needs to be removed from the vane stem 68 then the locking nut 164 may be unscrewed and the pin 192 drilled or pressed out without the need to disassemble any further components of the variable vane actuation system 62.

Technical effects of embodiments of the present disclosure include securing a vane arm to a vane stem using an interlocking feature on the vane arm and a stem notch on the vane stem and further utilizing a locking nut to push a wedge on the vane arm to set the interlocking connection between the interlocking feature on the vane arm and the stem notch on the vane stem.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A variable vane actuation system of a gas turbine engine, comprising:
   a vane arm having a radially inward facing surface, a radially outward surface opposite the radially inward facing surface, a wedge projecting radially outward from the radially outward facing surface of the vane arm, an aperture extending from the radially outward surface to the radially inward surface, and an interlocking feature located in the aperture and circumferentially opposite the wedge relative to the aperture; and
   a vane stem having a first end, a second end opposite the first end, a seat surface interposed between the first end and the second end, a primary portion extending from the first end to the seat surface, a secondary portion extending from the seat surface to the second end, and a stem notch configured to interlock with the interlocking feature of the vane arm to prevent axial motion between the vane stem and the vane arm along an axis of the vane stem,
   wherein the wedge and the vane arm are formed as a single piece comprising a unitary structure.

2. The variable vane actuation system of claim 1, further comprising:
- a locking nut having internal threads configured to mesh with external threads located on the primary portion of the vane stem; or
- a bolt having external threads configured to mesh with internal threads located on the primary portion of the vane stem.

3. The variable vane actuation system of claim 2, wherein the stem notch is configured to interlock with the interlocking feature of the vane arm when the secondary portion is within the aperture, the radially outward surface of the vane arm is flush with the seat surface of the vane stem, and the locking nut is installed on the primary portion of the vane stem.

4. The variable vane actuation system of claim 1, wherein the vane stem further comprises:
- a radially upper shoulder located in the secondary portion proximate the seat surface; and
- a radially lower shoulder located in the secondary portion and interposed between the radially upper shoulder and the second end,
- wherein the stem notch extends from the upper shoulder to the radially upper shoulder to the radially lower shoulder.

5. The variable vane actuation system of claim 1, wherein the interlocking feature of the vane arm includes a notch in the aperture extending into the vane arm.

6. The variable vane actuation system of claim 5, wherein the notch in the aperture is located proximate the radially outward surface of the vane arm.

7. The variable vane actuation system of claim 1, wherein the interlocking feature of the vane arm includes a pin.

8. The variable vane actuation system of claim 7, wherein the pin is oriented perpendicular to the stem notch.

9. The variable vane actuation system of claim 7, wherein the pin is oriented parallel to the stem notch.

10. The variable vane actuation system of claim 7, wherein the pin extends through the aperture.

11. The variable vane actuation system of claim 7, wherein the pin extends partially into the aperture.

12. A gas turbine engine comprising:
- a vane system; and
- a variable vane actuation system operably connected to the vane system, the variable vane actuation system comprising:
  - a vane arm having a radially inward facing surface, a radially outward surface opposite the radially inward facing surface, a wedge projecting away radially outward from the radially outward facing surface of the vane arm, an aperture extending from the radially outward surface to the radially inward surface, and an interlocking feature located in the aperture and circumferentially opposite the wedge relative to the aperture; and
  - a vane stem having a first end, a second end opposite the first end, a seat surface interposed between the first end and the second end, a primary portion extending from the first end to the seat surface, a secondary portion extending from the seat surface to the second end, and a stem notch configured to interlock with the interlocking feature of the vane arm to prevent axial motion between the vane stem and the vane arm along an axis of the vane stem,
  - wherein the wedge and the vane arm are formed as a single piece comprising a unitary structure.

13. The gas turbine engine of claim 12, further comprising:
- a locking nut having internal threads configured to mesh with external threads located on the primary portion of the vane stem; or
- a bolt having external threads configured to mesh with internal threads located on the primary portion of the vane stem.

14. The gas turbine engine of claim 12, wherein the vane stem further comprises:
- a radially upper shoulder located in the secondary portion proximate the seat surface; and
- a radially lower shoulder located in the secondary portion and interposed between the radially upper shoulder and the second end,
- wherein the stem notch extends from the upper shoulder to the radially upper shoulder to the radially lower shoulder.

15. The gas turbine engine of claim 12, wherein the interlocking feature of the vane arm includes a notch in the aperture extending into the vane arm.

16. The gas turbine engine of claim 15, wherein the notch in the aperture is located proximate the radially outward surface of the vane arm.

17. The gas turbine engine of claim 12, wherein the interlocking feature of the vane arm includes a pin.

18. The gas turbine engine of claim 17, wherein the pin is oriented perpendicular to the stem notch.

19. The gas turbine engine of claim 17, wherein the pin is oriented parallel to the stem notch.

20. The gas turbine engine of claim 17, wherein the pin extends through the aperture.

* * * * *